US012811187B2

(12) United States Patent
Badding et al.

(10) Patent No.: US 12,811,187 B2
(45) Date of Patent: Nov. 24, 2026

(54) SOLID ELECTROLYTE WITH LITHIUM SALT MODIFICATION LAYER

(71) Applicants: CORNING INCORPORATED, Corning, NY (US); Shanghai Institute of Ceramics, Chinese Academy of Sciences, Shanghai (CN)

(72) Inventors: Michael Edward Badding, Campbell, NY (US); Mingli Cai, Nantong (CN); Jun Jin, Shanghai (CN); Zhen Song, Painted Post, NY (US); Zhaoyin Wen, Shanghai (CN); Tongping Xiu, Shanghai (CN)

(73) Assignees: Corning Incorporated, Corning, NY (US); Shanghai Institute of Ceramics, Shanghai (CN)

( * ) Notice: Subject to any disclaimer, the term of this patent is extended or adjusted under 35 U.S.C. 154(b) by 972 days.

(21) Appl. No.: 17/955,757

(22) Filed: Sep. 29, 2022

(65) Prior Publication Data

US 2023/0094026 A1 Mar. 30, 2023

(30) Foreign Application Priority Data

Sep. 30, 2021 (CN) .......................... 202111163031.5

(51) Int. Cl.

*H01M 10/0562* (2010.01)
*H01M 10/0525* (2010.01)
*H01M 4/02* (2006.01)
*H01M 4/38* (2006.01)

(Continued)

(52) U.S. Cl.

CPC ... *H01M 10/0562* (2013.01); *H01M 10/0525* (2013.01); *H01M 2004/027* (2013.01); *H01M 2004/028* (2013.01); *H01M 4/382* (2013.01); *H01M 4/505* (2013.01); *H01M 4/525* (2013.01);

(Continued)

(58) Field of Classification Search

None

See application file for complete search history.

(56) References Cited

U.S. PATENT DOCUMENTS

2020/0235420 A1* 7/2020 Yushin .............. H01M 10/0565

FOREIGN PATENT DOCUMENTS

CN 103904360 A 7/2014
CN 110534798 A 12/2019
CN 111384390 A * 7/2020 ............ H01M 4/505

(Continued)

OTHER PUBLICATIONS

CN 1113844390 A (Machine Translation) (Year: 2025).*

(Continued)

*Primary Examiner* — Nicole M. Buie-Hatcher
*Assistant Examiner* — Kenneth Max Otero
(74) *Attorney, Agent, or Firm* — John P. McGroarty

(57) ABSTRACT

A lithium-metal battery includes: a cathode; a garnet solid-state electrolyte disposed on the cathode; and a lithium anode disposed on the garnet solid-state electrolyte, such that a modification layer is disposed at an interface of the lithium anode and garnet solid-state electrolyte, the modification layer comprising an inorganic lithium salt. A method of forming a lithium-metal battery includes treating garnet solid-state electrolyte with an acid solution; and exposing the acid-treated garnet solid-state electrolyte to hydrogen fluoride to form a modification layer atop the garnet solid-state electrolyte.

12 Claims, 11 Drawing Sheets

(51) Int. Cl.
*H01M 4/505* (2010.01)
*H01M 4/525* (2010.01)

(52) U.S. Cl.
CPC ............... *H01M 2300/0077* (2013.01); *H01M 2300/0094* (2013.01)

(56) References Cited

FOREIGN PATENT DOCUMENTS

| | | | | |
|---|---|---|---|---|
| CN | 112209742 A | * | 1/2021 | .......... H01M 10/058 |
| CN | 114300743 A | * | 4/2022 | |

OTHER PUBLICATIONS

CN 112209742 A (Machine Translation) (Year: 2025).*
Zhu et al. (Polydimethylsiloxane Thin Film as a Stable Interfacial Layer for High-Performance Lithium-Metal Battery Anodes, Adv. Mater., 29, 1603755) Zhu (Year: 2017).*
CN_1113844390_A__Machine_Translation_.pdf (Year: 2025).*
CN_112209742_A__Machine_Translation_.pdf (Year: 2025).*
CN_114300743_A_-_Machine_Translation.pdf (Year: 2025).*
Zhu et al. (Polydimethylsiloxane Thin Film as a Stable Interfacial Layer for High-Performance Lithium-Metal Battery Anodes, Adv. Mater. 2017, 29, 1603755) (Year: 2017).*
CN_1113844390_A_Machine_Translatio (Year: 2025).*
Papancea et al. (Bulletin of the Transilvania University of BraÅov â¢ vol. 7 (56) No. 2—2014 Series I: Engineering Sciences) (Year: 2014).*
Ye et al. (A Review on Li+/H+ Exchange in Garnet Solid Electrolytes: From Instability against Humidity to Sustainable Processing in Water, ChemSusChem 2021, 14, 4397â4407, Aug. 2021) (Year: 2021).*
Aguadero, A.; "Garnet electrolytes for solid state batteries: Visualization of moisture-induced chemical degradation and revealing its impact on the Li-ion dynamics"; Chem. Mater. 2018, 30, 3704-3713.
Baral, A. K.; "Correction to "Fast solid-state Li lon conduction garnet-type structure metal oxides for energy storage""; The journal of physical chemistry letters 2015, 6, (2), 1 page.
Chi, M .; "Interfacial stability of Li metal-solid electrolyte elucidated via in situ electron microscopy"; Nano Lett. 2016, 16, (11), 7030-7036.
Doef, M. "Effect of surface microstructure on electrochemical performance of garnet solid electrolytes"; ACS Appl. Mater. Interfaces 2015, 7, 2073-2081.
Gao, J., et al. Well-contacted Li/LLZTO interface by citric acid aqueous treatment for solid-state Li metal batteries [J]. Materials Letters, 2020, 280, 128543.
Goodenough, J. B.; "Garnet Electrolyte with an Ultralow interfacial resistance for Li-Metal Batteries"; J. Am. Chem. Soc. 2018, 140, (20), 6448-6455.
Goodenough, J. B.; "Hybrid Polymer/Garnet electrolyte with a small interfacial resistance for lithium-ion batteries"; Angew. Chem. Int. Ed. 2017, 56, (3), 753-756.
Goodenough, J. B.; "Optimizing Li+ conductivity in a garnet framework"; J. Mater. Chem. 2012 22, 15357-15361.
Guo, X.; "In situ formed shields enabling Li2CO3-free solid electrolytes: a new route to uncover the intrinsic lithiophilicity of garnet electrolytes for dendrite-free Li-metal batteries"; ACS Appl. Mater. Interfaces 2019, 11, 898-905.
Hu, L.; "Conformal, nanoscale ZnO surface modification of Garnet-based solid-state electrolyte for Lithium metal anodes"; Nano Lett. 2016, 17, (1), 565-571.
Hu, L.; "Garnet solid electrolyte protected Li-Metal batteries"; ACS Appl. Mater. Interfaces 2017, 9, 18809-18815.
Hu, L.; "Interface Engineering for Garnet-Based Solid-State Lithium-Metal Batteries: Materials, Structures, and Characterization"; Adv. Mater. 2018, 1802068.
Hu, L.; "Negating interfacial impedance in garnet-based solid-state Li metal batteries"; Nat. Mater. 2016, 16, (5), 572-579.
Hu, L.; "Reducing interfacial resistance between garnet-structured solid-state electrolyte and Li-metal anode by a germanium layer"; Adv. Mater. 2017, 29, 1606042.
Hu, L.; "Toward garnet electrolyte-based Li metal batteries: An ultrathin, highly effective, artificial solid-state electrolyte/metallic Li interface"; Sci. Adv. 2017, 3, e1601659.
Hu, L.; "Transient behavior of the metal interface in Lithium Metal-Garnet batteries"; Angew.Chem. Int.Ed. 2017, 56, 14942 -14947.
Hu, L.; "Transition from Superlithiophobicity to superlithiophilicity of garnet solid-state electrolyte"; J. Am. Chem. Soc. 2016, 138, (37), 12258-12262.
Huo, H., et al. In-situ formed Li2CO3-free garnet/Li interface by rapid acid treatment for dendrite-free solid-state batteries [J]. Nano Energy, 2019, 61, 119-125.
Li, B. J.; "Challenges and perspectives of garnet solid electrolytes for all solid-state lithium batteries"; Power Sources 2018, 389, 120-134.
Liu, H.; "Reaction mechanisms of lithium garnet pellets in ambient air: the effect of humidity and CO2"; J. Am. Ceram. Soc. 2017, 100, (7), 2832-2839.
Pinzaru, D.; "Garnet-type solid-state fast Li ion conductors for Li batteries: critical review"; Chem. Soc. Rev. 2014, 43, (13), 4714-4727.
Read, J.; "Chemical stability of cubic Li7La3Zr2O12 with molten lithium at elevated temperature"; J Mater Sci. 2013, 48, 5846-5851.
Ruan, Y., et al. Acid Induced Conversion towards Robust and Lithiophilic Interface for Li—Li7La3Zr2O12 Solid-State Battery [J]. Journal of Materials Chemistry A, 2019, 7, 14565-14574.
Sakamoto; "Surface chemistry mechanism of ultra-low interfacial resistance in the solid-state electrolyte Li7La3Zr2O12"; J. Chem. Mater. 2017, 29, (18), 7961-7968.
Wen, Z.; "Highly stable garnet solid electrolyte based Li—S battery with modified anodic and cathodic interfaces"; Energy Storage Materials 2018, 15, 282-290.
Wen, Z.; "Reversible ion exchange and structural stability of garnet-type Nb-doped Li7La3Zr2O12 in water for applications in lithium batteries"; Journal of Power Sources 2015, 282, 286-293.
Weppner, W.; "Fast lithium ion conduction in Garnet-type Li7La3Zr2O12"; Angew. Chem. Int. Ed. 2007, 46, 7778-7781.
Xin et al., "Solid-State Lithium Metal Batteries Promoted by Nanotechnology: Progress and Prospects"; ACS Energy Lett. 2017, 2, (6), 1385-1394.
Xu et al., "Lithium metal anodes for rechargeable batteries"; Energy Environ. Sci. 2014, 7, (2), 513-537.

* cited by examiner

SOLID ELECTROLYTE WITH LITHIUM SALT MODIFICATION LAYER

This application claims the benefit of priority under 35 U.S.C. § 119 of Chinese Patent Application Serial No. 202111163031.5 filed on Sep. 30, 2021, the content of which is relied upon and incorporated herein by reference in its entirety.

BACKGROUND

1. Field

This disclosure relates to solid electrolytes with lithium salt modification layers and methods of manufacturing thereof.

2. Technical Background

Conventional Li-ion batteries are already reaching their limits in terms of energy density and safety, posing a challenge for large-scale application in electrical equipment. For example, garnet-based solid-state Li-metal batteries have large interfacial resistance between the Li anode and garnet electrolyte. Due to the rigid ceramic nature and poor lithium wettability of garnet, contact between lithium metal and garnet is often insufficient, thereby leading to large polarization and high interfacial resistance.

The present application discloses improved Li anode/garnet electrolyte interfaces and methods of formation thereof for solid-state lithium metal battery applications.

SUMMARY

In embodiments, a lithium-metal battery, comprises a cathode; a garnet solid-state electrolyte disposed on the cathode; and a lithium anode disposed on the garnet solid-state electrolyte, wherein a modification layer is disposed at an interface of the lithium anode and garnet solid-state electrolyte, the modification layer comprising an inorganic lithium salt.

In aspects, which are combinable with any of the other aspects or embodiments, the modification layer comprises at least one of $LiBF_4$, $LiPF_6$, $LiPF_2O_2$, $Li_2SiF_6$, $LiAlF_4$, $Li_3AlF_6$, $LiAsF_6$, $LiSbF_6$, corresponding aquo-compounds thereof, and combinations thereof.

In aspects, which are combinable with any of the other aspects or embodiments, an interfacial area specific resistance (ASR) at the interface is less than 50 $\Omega \cdot cm^2$. In aspects, which are combinable with any of the other aspects or embodiments, the ASR is less than 15 $\Omega \cdot cm^2$.

In aspects, which are combinable with any of the other aspects or embodiments, a thickness of the modification layer is in a range of 20 nm to 1000 nm. In aspects, which are combinable with any of the other aspects or embodiments, the modification layer comprises nanopores having a diameter in a range of 1 nm to 100 nm.

In aspects, which are combinable with any of the other aspects or embodiments, the lithium anode is in continuous contact with the garnet solid-state electrolyte through the modification layer such that no gaps are observed at the interface. In aspects, which are combinable with any of the other aspects or embodiments, the modification layer is a part of the garnet solid-state electrolyte.

In aspects, which are combinable with any of the other aspects or embodiments, the battery has a critical current density (CCD) of ~2 mA $cm^{-2}$ at room temperature (RT).

In aspects, which are combinable with any of the other aspects or embodiments, the cathode comprises at least one of $LiNi_dCo_eMn_{1-d-e}O_2$ (NCM) (with 0<d<1, 0<e<1), $LiT_MO_2$ (with $T_M$=Sc, Ti, V, Mn, Fe, Co, Ni or Cu), $Li_2TiO_3$, $Li_4Ti_5O_{12}$, $Li_3VO_4$, $LiMn_2O_4$, $yLi_2MnO_3 \cdot (1-y)LiXO_2$ (with X=Ni, Co, or Mn and 0<y≤1), $LiNi_{0.8}Co_{0.15}Al_{0.05}O_2$(NCA), $LiNi_{0.5}Mn_{1.5}O_4$, $LiFePO_4$, or combinations thereof. In aspects, which are combinable with any of the other aspects or embodiments, the garnet solid-state electrolyte comprises at least one of (i) $Li_{7-3a}La_3Zr_2L_aO_{12}$, with L=Al, Ga or Fe and 0<a<0.33; (ii) $Li_7La_{3-b}Zr_2M_bO_{12}$, with M=Bi or Y and 0<b<1; (iii) $Li_{7-c}La_3(Zr_{2-c},N_c)O_{12}$, with N=In, Si, Ge, Sn, V, W, Te, Nb, or Ta and 0<c<1; or a combination thereof. In aspects, which are combinable with any of the other aspects or embodiments, the lithium anode comprises pure lithium metal or lithium alloy.

In embodiments, a method of forming a lithium-metal battery, comprises treating garnet solid-state electrolyte with an acid solution; and exposing the acid-treated garnet solid-state electrolyte to hydrogen fluoride to form a modification layer atop the garnet solid-state electrolyte.

In aspects, which are combinable with any of the other aspects or embodiments, the acid solution comprises: $H_3BO_3$, $H_3PO_4$, $H_3PO_3$, $H_3PO_2$, $H_4SiO_4$, $H_2SiO_3$, H2SiO$_5$, $H_3AlO_3$, $H_3AsO_4$, $H_3AsO_3$, and $H_3SbO_3$, or combinations thereof. In aspects, which are combinable with any of the other aspects or embodiments, prior to the treating step, the acid solution is dissolved by: (1) deionized water or (2) an aqueous solution mixture comprising deionized water and at least one organic solvent. In aspects, which are combinable with any of the other aspects or embodiments, the at least one organic solvent comprises: methyl alcohol, ethyl alcohol, isopropyl alcohol, ethyl acetate, acetone, acetonitrile, N,N-dimethylformamide, N-methylpyrrolidone, N-methylacetamide, and combinations thereof.

In aspects, which are combinable with any of the other aspects or embodiments, the hydrogen fluoride is a hydrogen fluoride vapor. In aspects, which are combinable with any of the other aspects or embodiments, the hydrogen fluoride is a hydrogen fluoride solution.

In aspects, which are combinable with any of the other aspects or embodiments, the modification layer comprises an inorganic lithium salt. In aspects, which are combinable with any of the other aspects or embodiments, the modification layer comprises at least one of $LiBF_4$, $LiPF_6$, $LiPF_2O_2$, $Li_2SiF_6$, $LiAlF_4$, $Li_3AlF_6$, $LiAsF_6$, $LiSbF_6$, corresponding aquo-compounds thereof, and combinations thereof.

In aspects, which are combinable with any of the other aspects or embodiments, a thickness of the modification layer is in a range of 20 nm to 1000 nm. In aspects, which are combinable with any of the other aspects or embodiments, the modification layer comprises nanopores having a diameter in a range of 1 nm to 100 nm. In aspects, which are combinable with any of the other aspects or embodiments, the modification layer is a part of the garnet solid-state electrolyte.

In aspects, which are combinable with any of the other aspects or embodiments, the method further comprises: adding a cathode; disposing the garnet solid-state electrolyte on the cathode; and disposing a lithium anode on the garnet solid-state electrolyte; wherein the modification layer is disposed at an interface of the lithium anode and garnet solid-state electrolyte.

In aspects, which are combinable with any of the other aspects or embodiments, the cathode comprises at least one of $LiNi_dCo_eMn_{1-d-e}O_2$ (NCM) (with 0<d<1, 0<e<1), $LiTMO_2$ (with $T_M$=Sc, Ti, V, Mn, Fe, Co, Ni or Cu), $Li_2TiO_3$, $Li_4Ti_5O_{12}$, $Li_3VO_4$, $LiMn_2O_4$, $yLi_2MnO_3\cdot(1-y)$ $LiXO_2$ (with X=Ni, Co, or Mn and $0<y\leq1$), $LiNi_{0.8}Co_{0.15}Al_{0.05}O_2$(NCA), $LiNi_{0.5}Mn_{1.5}O_4$, $LiFePO_4$, or combinations thereof.

In aspects, which are combinable with any of the other aspects or embodiments, an interfacial area specific resistance (ASR) at the interface is less than 15 $\Omega\cdot cm^2$. In aspects, which are combinable with any of the other aspects or embodiments, the lithium-metal battery has a critical current density (CCD) of ~2 mA $cm^{-2}$ at room temperature (RT). In aspects, which are combinable with any of the other aspects or embodiments, the lithium anode is in continuous contact with the garnet solid-state electrolyte through the modification layer such that no gaps are observed at the interface.

BRIEF DESCRIPTION OF THE DRAWINGS

The disclosure will become more fully understood from the following detailed description, taken in conjunction with the accompanying figures, in which:

FIG. 2D illustrates elemental distribution maps of fluorine (F), boron (B), oxygen (O), and lanthanum (La) corresponding to FIG. 2B in Sample 1, according to some embodiments.

(FIG. 8B), according to some embodiments.

DETAILED DESCRIPTION

Figure 1:
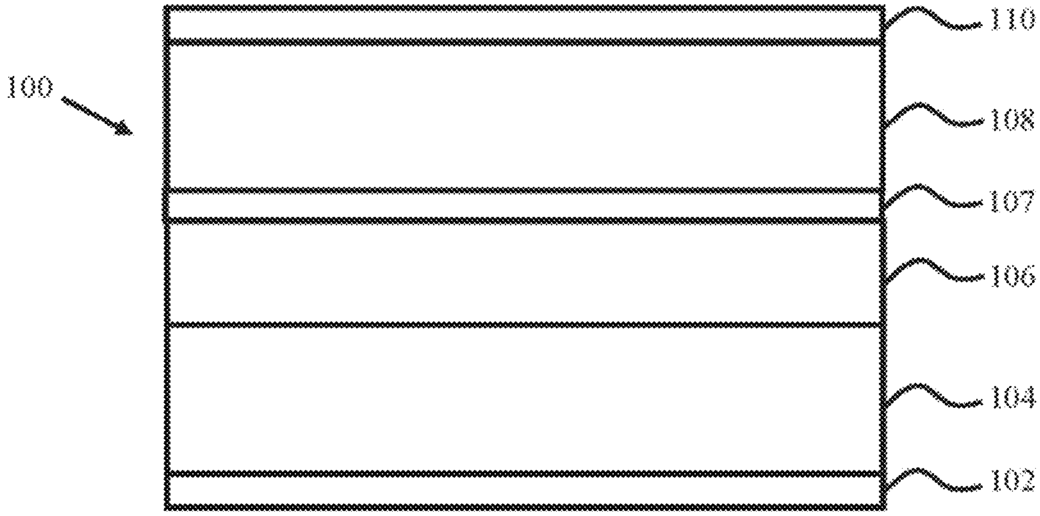
FIG. 1 illustrates a general structure of a solid-state lithium metal battery, according to some embodiments.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments. It should be understood that the present application is not limited to the details or methodology set forth in the description or illustrated in the figures. It should also be understood that the terminology is for the purpose of description only and should not be regarded as limiting.

Additionally, any examples set forth in this specification are illustrative, but not limiting, and merely set forth some of the many possible embodiments of the claimed invention. Other suitable modifications and adaptations of the variety of conditions and parameters normally encountered in the field, and which would be apparent to those skilled in the art, are within the spirit and scope of the disclosure.

Solid-state batteries (SSBs) have attracted much attention due to their high safety and improved energy density. As disclosed herein, a solid state lithium metal battery is disclosed based on inorganic solid-state electrolytes (SSE), for example, a garnet-type SSE, which has high ionic conductivity and stability against Li metal. However, due to the rigid nature and impurities on the surface, SSE shows poor wettability with molten lithium. The poor contact between the rigid ceramic and metallic Li causes a large interfacial area specific resistance (ASR) and the uneven lithium ion flux during the cycling. The concentrated Li ion flux further results in a rapid dendrite penetration along the grain boundary. Thus, the garnet-based solid state batteries suffer from the short lifespan.

Aimed at solving the problems above, heating, compressing, or introducing organic buffer layers like polyethylene oxide (PEO) were proposed to reduce the interfacial ASR. Thereafter, lithiophilic thin films (e.g., Al, Si, Ge, Mg, Au, ZnO, $Al_2O_3$, etc.) were disposed at the Li anode/garnet electrolyte interface via plasma enhanced chemical vapor deposition (PECVD), electron beam thermal evaporation (EBE) or atomic layer deposition (ALD). However, this method is expensive and complex, especially for large-scale implementation. Other studies attempted to remove the $Li^+$-insulating layer from the surface of the solid electrolyte, including introducing carbon to react with $Li_2CO_3$ at 700° C. or direct polishing. Another alternative approach involved application of very high external mechanical pressures to Li anode/garnet electrolyte interface for sufficient contact. This method often resulted in damage to the battery cell, is difficult to implement, and does not assure a sufficiently low interfacial resistance.

Each of these strategies has its own disadvantages, including imperfect contact effects; cost limitations, with deposition techniques being costly and complex, making them unusable for large-scale integration. Accordingly, the present disclosure seeks a simple, effective and scalable approach to modifying the SSE surface to improve Li wetting and electrochemical performance for future application in solid-state Li batteries.

The present disclosure relates to a solid electrolyte with lithium salt modification layer used in solid-state Li batteries. The modification layer was mainly composed of inorganic lithium salt comprising at least one of the $LiBF_4$, $LiPF_6$, $LiPF_2O_2$, $Li_2SiF_6$, $LiAlF_4$, $Li_3AlF_6$, $LiAsF_6$, $LiSbF_6$ and their corresponding aquo-compounds, or combinations thereof.

The layer was in situ introduced onto the SSE surface via the following process. The SSE surface was first treated by at least one of aqueous $H_3BO_3$, $H_3PO_4$, $H_3PO_3$, $H_3PO_2$, $H_4SiO_4$, $H_2SiO_3$, H2SiO$_5$, $H_3AlO_3$, $H_3AsO_4$, $H_3AsO_3$, and $H_3SbO_3$ solutions, or combinations thereof. Solvents used to dissolve the above acids may be deionized water or aqueous solution mixed with deionized water and other organic solvents, comprising at least one of methyl alcohol, ethyl alcohol, isopropyl alcohol, ethyl acetate, acetone, acetonitrile, N,N-dimethylformamide, N-methylpyrrolidone, N-methylacetamide, and combinations thereof. Thereafter, HF vapor or solution may be used to modify the SSE surface to form the final modification layer. The modification layer exhibits superior lithiophilicity. The modification layer can react with metal anode to form functional interphase, thereby greatly enhancing the affinity between the SSE and anode and reducing interfacial resistance.

The formed functional interphase with high surface energy guides horizontal deposition of lithium, so as to inhibit formation and growth of dendrites. Based on the SSE with modification layer, symmetric batteries achieve a greatly reduced ASR of ~9 $\Omega cm^2$ and an improved critical current density (CCD) of ~2 mA $cm^{-2}$ at room temperature (RT). Solid-state batteries with $LiFePO_4$ (LFP) or $LiNi_{0.5}Co_{0.2}Mn_{0.3}O_2$(NCM523) cathode display excellent long-term cycling performance and can work normally at high current density.

FIG. 1 illustrates a general structure of a solid-state lithium metal battery, according to some embodiments. It will be understood by those of skill in the art that the processes described herein can be applied to other configurations of solid-state lithium metal battery structures.

In some embodiments, battery 100 may include a substrate 102 (e.g., a current collector), a cathode 104 disposed on the substrate, a solid-state electrolyte 106 disposed on the cathode a lithium electrode (e.g., anode) 108 disposed on the solid-state electrolyte, a discoloration layer 107 disposed between the solid-state electrolyte and the anode, and a second current collector 110 disposed on the anode. These can be disposed horizontally in relation to each other or vertically.

In some embodiments, the battery may include an optional coating layer disposed on the cathode; an optional first interlayer disposed between either the coating layer or the substrate and the solid-state electrolyte; an optional second interlayer disposed between the solid-state electrolyte and the lithium electrode; an optional third interlayer disposed between the solid-state electrolyte and the cathode; or combinations thereof.

In some examples, the substrate 102 may a current collector including at least one of three-dimensional nickel (Ni) foam, carbon fiber, foils (e.g., aluminum, stainless steel, copper, platinum, nickel, etc.), or a combination thereof.

In some examples, the optional first, second, and/or third interlayers may be independently chosen from at least one of carbon-based interlayers (e.g., interlinked freestanding, micro/mesopore containing, functionalized, biomass derived); polymer-based interlayers (e.g., polyethylene oxide (PEO), polypyrrole (PPY), polyvinylidene fluoride, etc.); metal-based (e.g., Ni foam, etc.); liquid electrolytes (e.g., $LiPF_6$ in ethylene (EC)/dimethyl carbonate (DMC); ionic liquid-based (e.g., $LiCF_3SO_3/CH_3CONH_2$ or $PEO_{18}$LiTFSI-10% $SiO_2$-10% IL, the latter being a combination of PEO, bis(trifluoromethane) sulfonimide lithium salt ($LiN(CF_3SO_2)_2$, or LiTFSI), $SiO_2$ nanoparticles, and ionic liquid); or a combination thereof.

In some examples, solid-state electrolyte 106 may be used to address common safety concerns such as leakage, poor chemical stability, and flammability often seen in Li-metal batteries employing liquid electrolytes. Moreover, solid-state electrolytes can also suppress polysulfide shuttling from the cathode to the anode, thereby leading to improved cathode utilization and a high discharge capacity and energy density. In some examples, the solid-state electrolyte may include at least one of garnet (e.g., $Li_7La_3Zr_2O_{12}$ (LLZO), doped-LLZO (e.g., with Al, Mo, W, Nb, Sb, Ca, Ba, Sr, Ce, Hf, Rb, Ta, or combinations thereof), $Li_{6.4}La_3Zr_{1.4}Ta_{0.6}O_{12}$ or $Li_{6.5}La_3Zr_{1.4}Ta_{0.5}O_2$ (both LLZTO), or combinations thereof), $Li_{10}GeP_2S_{12}$, $Li_{1.5}Al_{0.5}Ge_{1.5}(PO_4)_3$, $Li_{1.4}Al_{0.4}Ti_{1.6}(PO_4)_3$, $Li_{0.55}La_{0.35}TiO_3$, interpenetrating polymer networks of poly(ethyl acrylate) (ipn-PEA) electrolyte, three-dimensional ceramic/polymer networks, in-situ plasticized polymers, composite polymers with well-aligned ceramic nanowires, PEO-based solid-state polymers, flexible polymers, polymeric ionic liquids, in-situ formed $Li_3PS_4$, $Li_6PS_5Cl$, or combinations thereof.

In some examples, the anode 108 may comprise lithium (Li) metal. In some examples, the battery may include at least one anode protector such as electrolyte additives (e.g., $LiNO_3$, lanthanum nitrate, copper acetate, $P_2S_5$, etc.), artificial interfacial layers (e.g., LiN, $(CH_3)_3SiCl$, $Al_2O_3$, LiAl, etc.), composite metallics (e.g., $Li_7B_6$, Li-rGO (reduced graphene oxide), layered Li-rGO, etc.), or combinations thereof. In some examples, a thin layer of metal (e.g., Au) may be ion-sputter coated to form a contact interface between the anode 108 and the first interlayer or between the anode and the solid-state electrolyte. In some examples, a thin layer of silver (Ag) paste may be brushed to a surface of the solid-state electrolyte 106 to form a close contact between the anode 108 and solid-state electrolyte 106.

In some examples, the optional coating layer may comprise at least one of carbon polysulfides (CS), polyethylene oxides (PEO), polyaniline (PANI), polypyrrole (PPY), poly(3,4-ethylenedioxythiophene) (PEDOT), polystyrenesulfonic acid (PSS), polyacrylonitrile (PAN), polyacrylic acid (PAA), polyallylamine hydrochloride (PAH), poly(vinylidene fluoride-co-hexafluoropropylene) (P(VdF-co-HFP)), poly(methylmethacrylate) (PMMA), polyvinylidene fluoride (PVDF), poly(diallyldimethyl ammonium) bis(trifluoromethanesulfonyl)imide (TFSI) (PDDATFSI), or combinations thereof, and at least one lithium salt (e.g., bis(trifluoromethane) sulfonimide lithium salt ($LiN(CF_3SO_2)_2$) (LiTFSI), lithium perchlorate, lithium bis(oxalato) borate (LiBOB), lithium bis(fluorosulfonyl)imide (LiFSI), lithium trifluoromethanesulfonate ($LiCF_3SO_3$) (LiTf), lithium bis (trifluoromethanesulfonimide) ($Li(C_2FSO_2)_2N$) (LiBETI), or combinations thereof). In some examples, the optional coating layer may additionally comprise at least one of, or at least two of, or at least three of nitrogen, carbon, cobalt, titanium, tantalum, and tungsten.

In some examples, the cathode 104 may comprise at least one of: $LiCoO_2$, $LiNiO_2$, $Li_2MnO_3$, $LiNi_{0.5}Mn_{1.5}O_4$, $LiFePO_4$, $LiNi_xCo_yMn_{1-x-y}O_2$, or combinations thereof. In some examples, the cathode 104 may comprise at least one of $LiNi_dCo_eMn_{1-d-e}O_2$ (NCM) (with 0<d<1, 0<e<1), $LiT_MO_2$ (with $T_M$=Sc, Ti, V, Mn, Fe, Co, Ni or Cu), $Li_2TiO_3$, $Li_4Ti_5O_{12}$, $Li_3VO_4$, $LiMn_2O_4$, $yLi_2MnO_3\cdot(1-y)LiXO_2$ (with X=Ni, Co, or Mn and $0<y\leq1$), $LiNi_{0.8}Co_{0.1}Al_{0.05}O_2$ (NCA), $LiNi_{0.5}Mn_{1.5}O_4$, $LiFePO_4$, or combinations thereof. In some examples, the cathode 104 may comprise a composite sulfur cathode including a conductive carbon component (e.g., carbonized dispersed cotton fiber (CDCF)), an electrolyte component (e.g., $Li_{10}GeP_2S_{12}$, $\beta$-$Li_3PS_4$, $Li_{9.6}P_3S_{12}$, $Li_3PS_4$, $Li_7P_3S_{11}$, a $x(Li_2S)$-$y(P_2S_5)$ electrolyte material (where x and y are greater than one), etc.), and/or elemental sulfur. In some examples, the composite sulfur cathode may also include an ionic liquid **104*d*** (e.g., PY14FSI, PY14TFSI, P13TFSI, P14TFSI, PYR13TFSI, PP14TFSI, or combinations thereof).

EXAMPLES

Example 1—Preparation of Garnet Electrolyte Pellets

Cubic phase $Li_{6.5}La_3Zr_{1.5}Ta_{0.5}O_{12}$ (LLZTO) was synthesized and sintered into ceramic pellets by traditional solid phase method. $LiOH\cdot H_2O$ (AR), $La_2O_3$ (99.99%), $ZrO_2$ (AR) and $Ta_2O_5$ (99.99%) were mixed by ball milling in a stoichiometric ratio, with 10 wt. % excess of $LiOH\cdot H_2O$ to compensate for lithium loss during the sintering process. Dry $La_2O_3$ powder was obtained by heating at 900° C. for 12 hrs (i.e., traces of moisture and adsorbed $CO_2$ are removed from $La_2O_3$). The mixture of the powder was dried and calcined at 950° C. for 6 hrs in an alumina crucible to obtain pure cubic phase LLZTO powder. The LLZTO powder was ball milled at 250 rpm for 24 hrs to obtain refined powder. Thereafter, the prepared LLZTO powder was pressed and calcined at 1250° C. for 30 min in platinum crucible in air. The garnet pellets were polished (for example, using silicon carbide (SiC) sandpaper) and stored in an Ar-filled glove box. The final ceramic pellets are about 1.0 mm thick and ~13.5 mm in diameter.

Example 2—Preparation of LLZTO with Modification Layer

Aqueous $H_3BO_3$ solution was eye-dropped onto polished LLZTO surface. Then, the LLZTO was washed and treated with HF vapor or HF solutions and then dried. $H_3BO_3$ reacts with instantly generated LiOH from $H^+/Li^+$ exchange to form Li—B—O, which was then fluorinated by HF vapor to form Li—B—F layer on the SSE surface. Then, the SSE with lithium salt modification layer (LLZTO-BF) was obtained.

Example 3—Preparation of LFP/NCM Cathode

The $LiFePO_4$ (LFP) and $LiNi_{0.5}Co_{0.2}Mn_{0.3}O_2$(NCM523) cathode was prepared by slurry coating technique. LFP/NCM523 powder, super P carbon powder (carbon source), Vapor Grown Carbon Fiber (VGCF) electronic conductive carbon and PVDF as binder in weight ratio of 8:0.5:0.5:1 were mixed in N-methylpyrrolidone (NMP) by ball milling for 6 hrs. Then, the slurry is coated on Al foil by blade casting. This cathode coated aluminum foil was dried for 4 hrs, followed by continuously drying under vacuum. The obtained cathode was cut into Φ12 mm discs. The mass loading of LFP was about 5.8 mg $cm^{-2}$. The mass loading of NCM523 was about 3 mg $cm^{-2}$.

Example 4—Assembly of Symmetric Li Batteries

Assembly of symmetric Li batteries was finished in the following process: fresh Li foils were attached and pressed onto the both sides of the polished bare/modified LLZTO, which was then placed at 250° C. for about 3 min. In some examples, the garnet pellet sandwiched between two Li foils is positioned in a stainless steel plate and heated at a temperature in a range of 250° C. to 400° C. for a time in a range of 1 sec to 20 min, followed by naturally cooling to room temperature.

In some examples, the heating is conducted at a temperature in the range of 250° C. to 400° C., or 275° C. to 375° C., or 300° C. to 350° C. (e.g., 340° C.), or 250° C. to 300° C., or 350° C. to 400° C., or any value or range disclosed therein. In some examples, the time is conducted in the range of 1 sec to 20 min, or 30 sec to 15 min, or 1 min to 10 min, or 3 min to 10 min, or 5 min to 10 min, or any value or range disclosed therein.

All cells were assembled in CR2025 coin cells. The whole process was conducted in an argon filled glove-box. Sealing pressure of the coin cell is in a range of 1 MPa to 10 MPa (e.g., ~5 MPa). Ni foam serves as a cushion to avoid garnet crack during sealing, lithium sheets function as the electrode, and the garnet pellet serves as a separator for charge (e.g., electron, $Li^+$ ion) conductors. These types of Li symmetric cells may be used to measure interfacial resistance between Li and garnet and also estimate cycling stability of the Li/garnet interface—i.e., by charging and discharging (e.g. Li stripping/plating from one Li sheet on a first side of the garnet to the second Li sheet on a second side of the garnet) under an applied voltage.

Example 5—Assembly of Solid State Batteries

Assembly of solid-state batteries matched with LFP/NCM523 cathodes was finished in the following process: fresh Li foil was first melted on modified LLZTO, 10 μL liquid electrolyte (1M $LiPF_6$ in EC/DMC/DEC) was eye-dropped onto the cathode foil, then the LLZTO with melted Li was placed upon the wetted cathode. All the cells were assembled in CR2025 coin cells. The whole process was conducted in an argon filled glove-box.

Example 6—Characterization Studies

Materials Characterization

Products (i.e., phase structures) of LLZTO powders with $H_3BO_3$/HF were identified by X-ray diffractometer (XRD Rigaku) equipped with Cu Kα radiation (λ=1.5405 Å) (40 kV, 30 mA, 5°/min, 10°~80°). A field emission scanning electron microscope (FESEM, microstructure images; Magellan-400) coupled with an energy-dispersive X-ray analysis system (EDS Horiba250) and X-ray photoelectron spectroscopy (XPS, surface chemistry; Thermo Scientific ESCAlab250) technology were selected to characterize the material properties.

Electrochemical Impedance Spectroscopy

Electrochemical impedance spectroscopy (EIS) was conducted on an electrochemical workstation (Autolab PGSTAT302N Netherland) with the frequency range from $10^5$ to 0.1 Hz and an alternating current (AC) amplitude of 10 mV.

Electrochemical Performance

All the assembled batteries were tested on a battery test system (NEWARE BTS-4000). Galvanostatic charge-discharge tests and critical current density (CCD) tests were carried out to measure the performance of the symmetric Li batteries. The charge/discharge tests of full cells were tested at different rates (1 C corresponding to 170 mAh $g^{-1}$ for LFP cathode; 1 C corresponding to 200 mAh $g^{-1}$ for NCM523 cathode) at room temperature or 60° C.

Example 7—Sample Preparation

Sample 1

60 μL of 1 M aqueous $H_3BO_3$ solution was eye-dropped onto a polished LLZTO surface. After reacting for about 1 minute, the LLZTO was washed by absolute alcohol. Then, the LLZTO was treated with 1 M HF vapor for 30 seconds and dried. The modified LLZTO attached with molten Li at both sides was used to assemble the symmetric Li battery sealed in a 2025-type coin cell.

Sample 2

Same as that in Sample 1, except that 60 μL of 1 M aqueous $H_3BO_3$ solution was replaced by 100 μL of 0.6 M $H_3BO_3$ aqueous/alcohol solution.

Sample 3

Same as that in Sample 1, except that 1 M HF vapor was replaced by 0.5 M aqueous HF solution.

Sample 4

Same as that in Sample 3, except that the LLZTO was treated with HF solution for 10 seconds.

Sample 5

60 μL of 1 M aqueous $H_3BO_3$ solution was eye-dropped onto a polished LLZTO surface. After reacting for about 1 minute, the LLZTO was washed by absolute alcohol. Then, the LLZTO was treated with 1 M HF vapor for 30 seconds and dried. The modified LLZTO with one-side molten Li was pressed on a wetted NCM523 cathode foil to assemble the solid state full batteries in a 2025-type coin cell. The batteries were operated at 25° C.

Sample 6

Same as that in Sample 5, except that the cathode is LFP and the batteries was operated at 60° C.

Comparative Sample

The prepared LLZTO was only polished. Then, the unmodified LLZTO was attached with molten Li to assemble the symmetric Li batteries in 2025-type coin cells.

Example 8—Sample Characterization

Figure 2A:
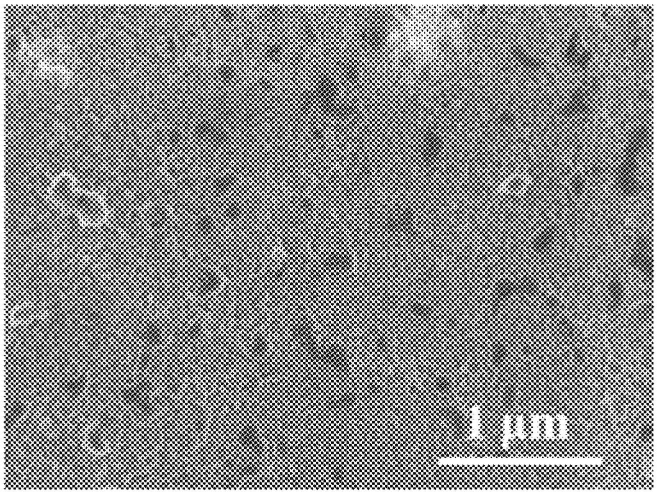
FIGS. 2A-2D illustrate top view (FIGS. 2A, 2B) and cross-sectional view (FIG. 2C) scanning electron microscope (SEM) images of LLZTO with a modification layer at various magnifications in Sample 1, according to some embodiments.
Figure 2B:
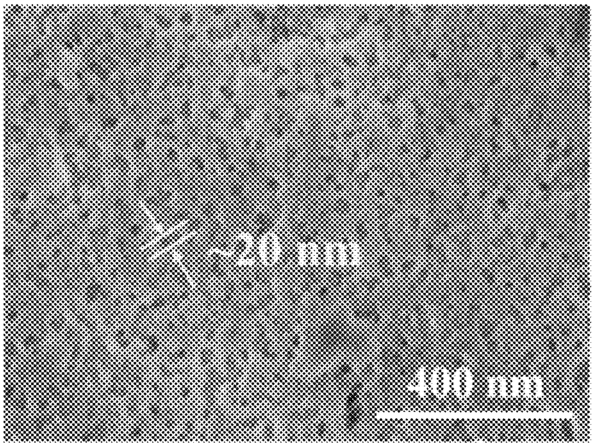
Figure 2C:
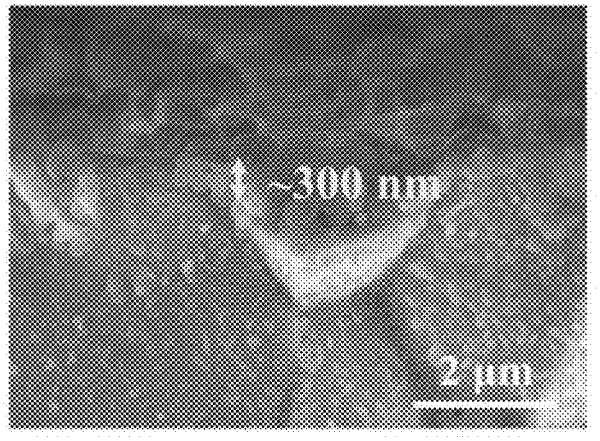
Figure 2D:
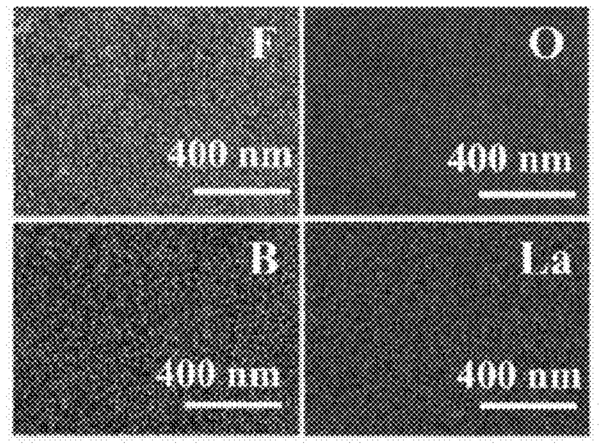

FIGS. 2A-2C illustrate top view (FIGS. 2A, 2B) and cross-sectional view (FIG. 2C) scanning electron microscope (SEM) images of LLZTO with a modification layer at various magnifications in Sample 1. FIG. 2D illustrates elemental distribution maps of fluorine (F), boron (B), oxygen (O), and lanthanum (La) corresponding to FIG. 2B in Sample 1.

Results show that a modification layer with porous structure is covered on the LLZTO surface. Nano-pores of the modification layer show a diameter of ~20 nm. In aspects, nano-pores of the modification layer may have a diameter in a range of 1 nm to 100 nm, or 1 nm to 50 nm, or 50 nm to 100 nm, or 1 nm to 25 nm, or 75 nm to 100 nm, or any value or sub-range disclosed therein. The corresponding elemental maps indicate that elements boron and fluorine are evenly and densely distributed on the SSE surface, such that the compounds containing boron and fluorine are successfully introduced onto the SSE surface. FIG. 2C shows that the modification layer is about 300 nm in thickness and is in tight and continuous contact with the substrate. In aspects, the modification layer may have a thickness in a range of 20 nm to 1000 nm, or 20 nm to 500 nm, or 500 nm to 1000 nm, or 20 nm to 200 nm, or 200 nm to 400 nm, or 400 nm to 600 nm, or 600 nm to 800 nm, or 800 nm to 1000 nm, or any value or sub-range disclosed therein.

Figure 3:
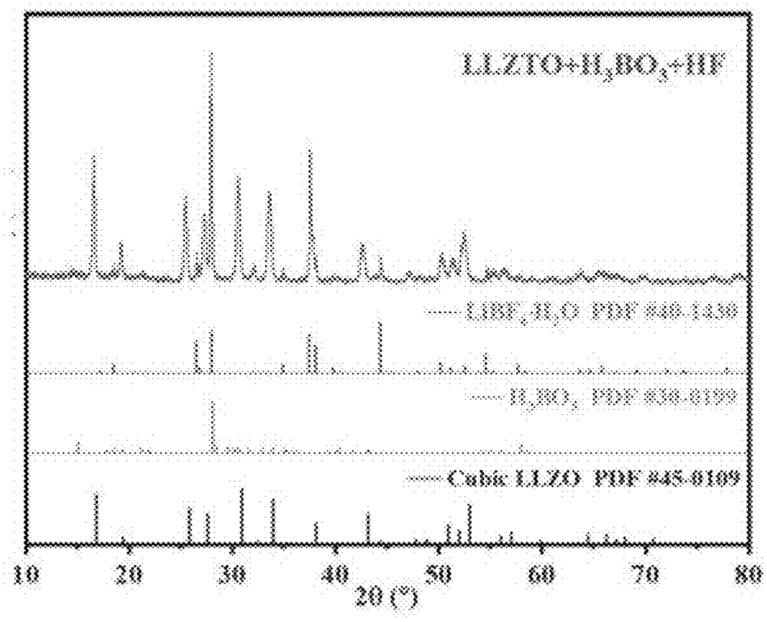
FIG. 3 illustrates an x-ray diffraction (XRD) pattern of the reaction products of LLZTO powders with aqueous $H_3BO_3$ and HF solutions, according to some embodiments.

FIG. 3 illustrates an x-ray diffraction (XRD) pattern of the reaction products of LLZTO powders with aqueous $H_3BO_3$ and HF solutions. The XRD results show the main reaction products are $LiBF_4 \cdot H_2O$ and $H_3BO_3$, meaning that LLZTO mixed with aqueous $H_3BO_3$ and HF solutions induces a reaction between acid and generated LiOH from $H^+/Li^+$ exchange, to form Li—B—F layer on the SSE surface, in this case, mainly producing organic lithium salt $LiBF_4$. $H_3BO_3$ reacts with LiOH from $H^+/Li^+$ exchange to form Li—B—O, which is then fluorinated by HF to form the Li—B—F layer on the SSE surface.

Figure 4A:
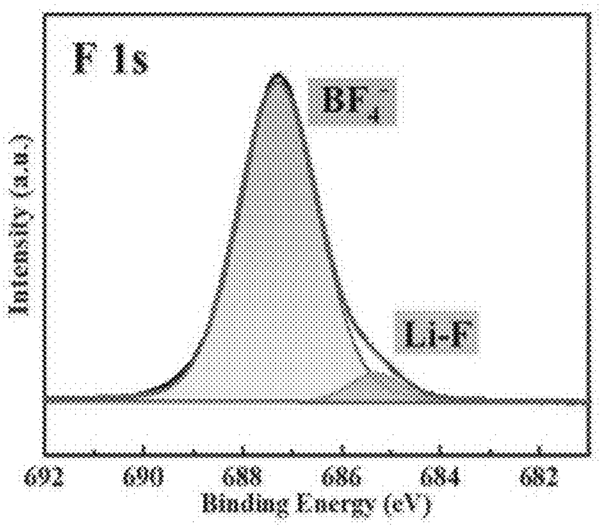
FIGS. 4A and 4B illustrate x-ray photoelectron spectroscopy (XPS) spectra of modified LLZTO surface, including F 1s spectra (FIG. 4A) and B 1s spectra (FIG. 4B) in Sample 1, according to some embodiments.
Figure 4B:
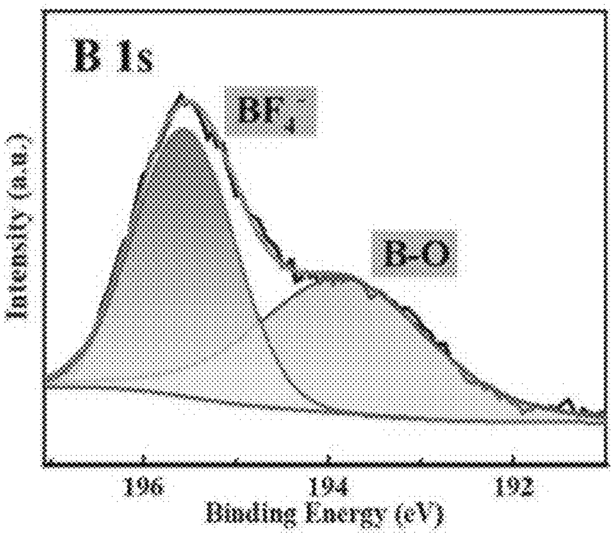

FIGS. 4A and 4B illustrate x-ray photoelectron spectroscopy (XPS) spectra of modified LLZTO surface, including F 1s spectra (FIG. 4A) and B 1s spectra (FIG. 4B) in Sample 1. The F 1s spectrum (FIG. 4A) shows two peaks at 687.3 eV and 685.3 eV, indicating the existence of $BF_4^-$ and LiF. The B 1s spectrum (FIG. 4B) shows two peaks at 195.6 eV and 193.8 eV, corresponding to the presence of $BF_4^-$ and B—O group, respectively. Thus, combining the data from FIGS. 4A and 4B, it is determined that the modification layer comprises mainly $LiBF_4 \cdot H_2O$ ($BF_4^-$), $H_3BO_3$ (B—O), and LiF.

Figure 5A:
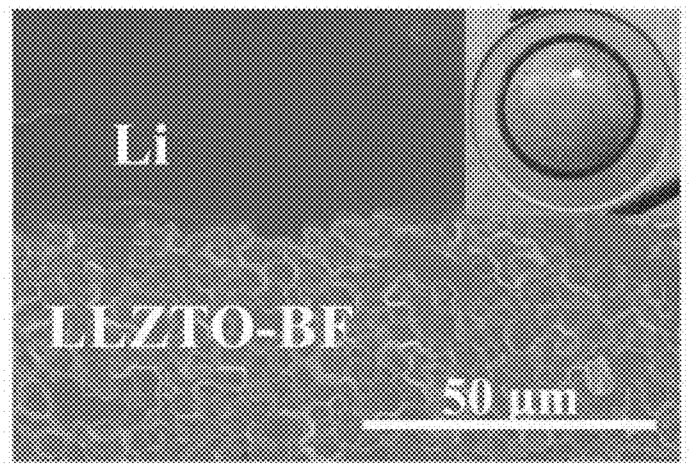
FIGS. 5A and 5B illustrate cross-sectional view SEM images of LLZTO-BF/Li at various magnifications in Sample 1, according to some embodiments.
Figure 5B:
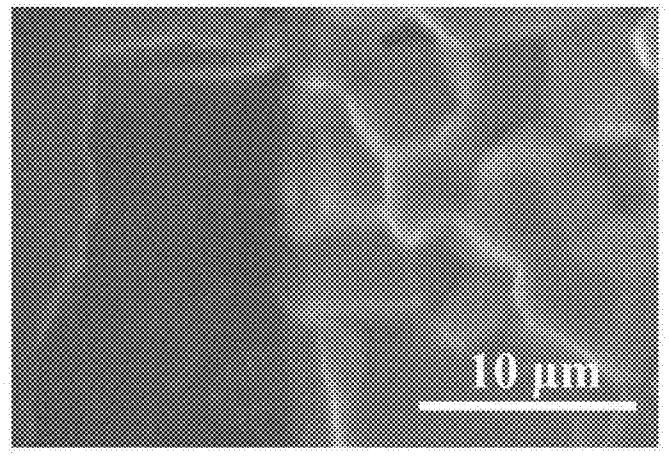

FIGS. 5A and 5B illustrate cross-sectional view SEM images of LLZTO-BF/Li at various magnifications in Sample 1. The LLZTO electrolyte with modification layer shows superior lithiophilicity (i.e., affinity of a material with lithium material), with the molten lithium tightly contacting the LLZTO. No gaps or defects can be observed at the LLZTO-BF (electrolyte)/Li (electrode) interface.

Figure 6A:
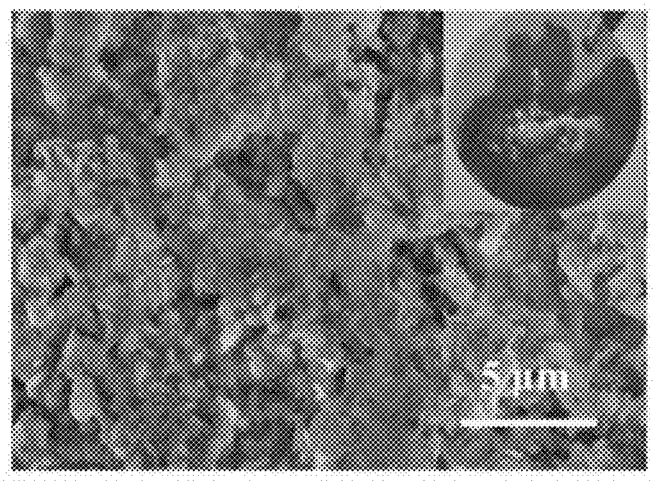
FIGS. 6A-6F illustrate a top view SEM image of the interphase formed by the reaction between LLZTO-BF and molten Li (FIG. 6A; inset: corresponding digital image); elemental distribution maps of fluorine (F), boron (B), oxygen (O), and lanthanum (La) corresponding to FIG. 6A (FIG. 6B); cross-sectional view SEM images of LLZTO with formed interphase at various magnifications (FIGS. 6C, 6D) (inset of FIG. 6D: analysis result of energy-dispersive X-ray spectroscopy (EDS) in line scan mode); and XPS spectra of the formed interphase, including F 1s spectra (FIG. 6E) and B 1s spectra (FIG. 6F) in Sample 1, according to some embodiments.
Figure 6B:
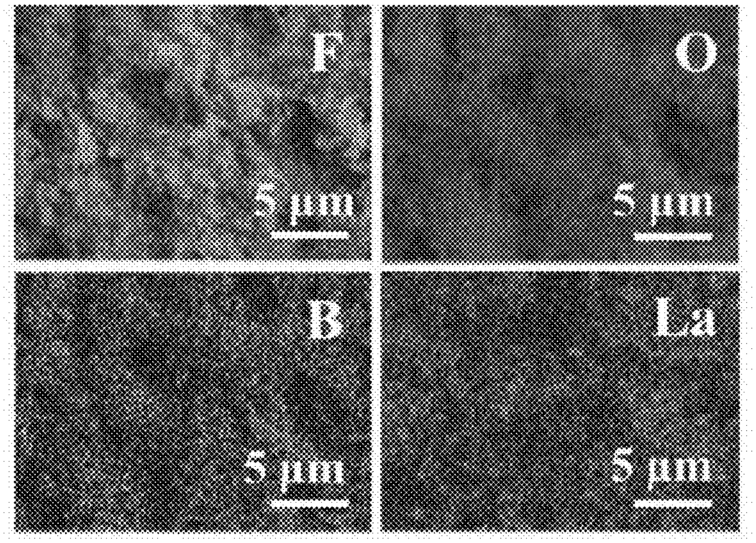
Figure 6C:
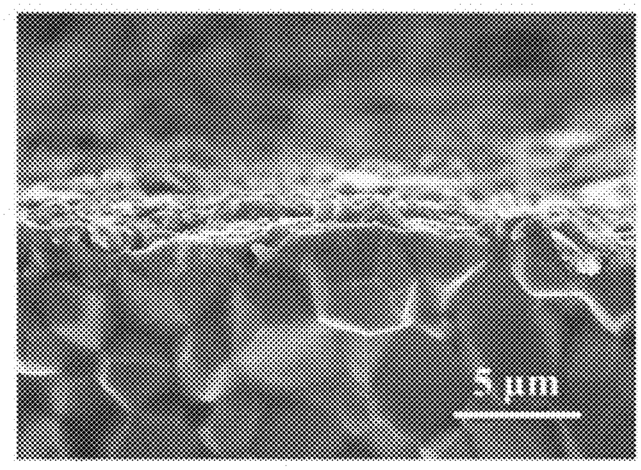
Figure 6D:
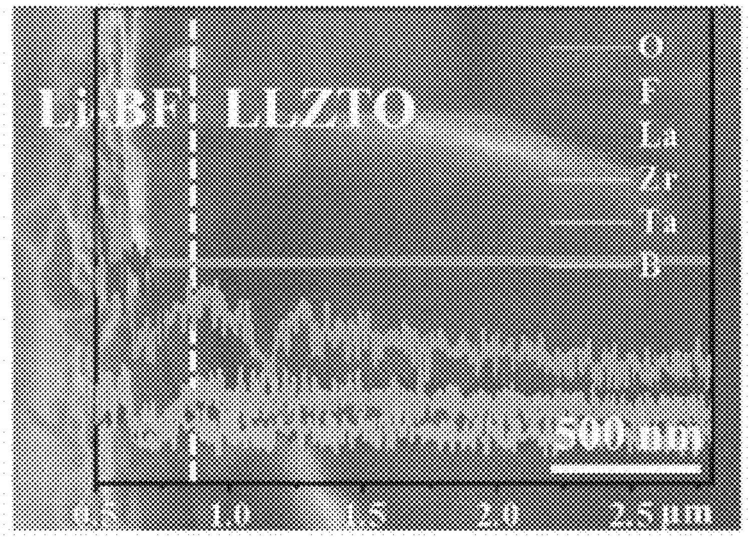
Figure 6E:
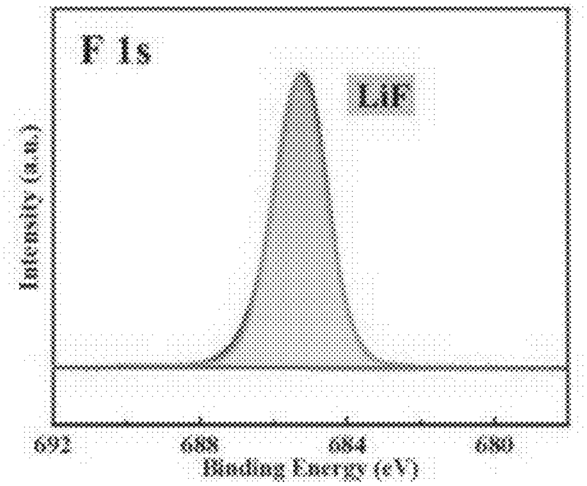
Figure 6F:
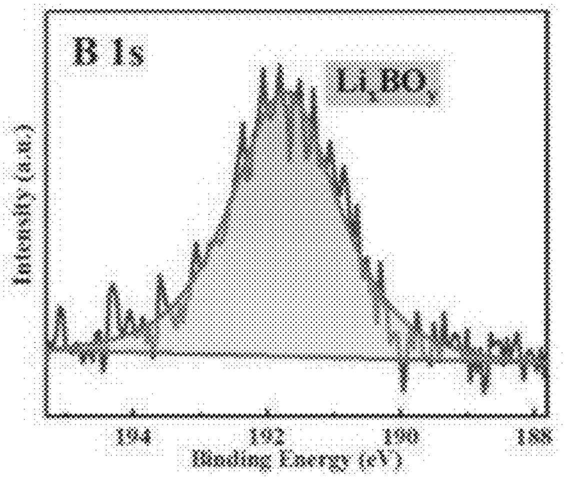

FIGS. 6A-6F illustrate a top view SEM image of the interphase formed by the reaction between LLZTO-BF and molten Li (FIG. 6A; inset: corresponding digital image); elemental distribution maps of fluorine (F), boron (B), oxygen (O), and lanthanum (La) corresponding to FIG. 6A (FIG. 6B); cross-sectional view SEM images of LLZTO with formed interphase at various magnifications (FIGS. 6C, 6D) (inset of FIG. 6D: analysis result of energy-dispersive X-ray spectroscopy (EDS) in line scan mode); and XPS spectra of the formed interphase, including F 1s spectra (FIG. 6E) and B 1s spectra (FIG. 6F) in Sample 1.

FIG. 6A shows that edges of molten Li turned black in a short time, with the black area continuing to spread along the surface of the electrolyte with the modification layer and indicating a rapid chemical reaction between the modification layer and molten lithium. The black area is mainly composed of LiF and $Li_xBO_y$, which can effectively suppress Li dendrites as functional SEI. According to FIG. 6B, boron and fluorine elements remain on the surface of the electrolyte with the modification layer. Both FIGS. 6C and 6D indicate that the formed interphase is in close contact with LLZTO. Signals of elements B and F, but no signals of La, Zr and Ta are detected at the interface, demonstrating that the interphase exhibits a thickness of ~300 nm. From FIG. 6E, the F 1s spectrum shows only a peak corresponding to LiF at 685.3 eV, while from FIG. 6F, the B 1s spectrum shows a peak corresponding to $Li_xBO_y$ at 191.7 eV. Both LiF and $Li_xBO_y$ are Li-ion conductive and electronically insulating, which allows Li-ion transport and blocks the electrons through the interface. Furthermore, LiF has a high surface energy, which can guide the horizontal deposition of lithium. This functional SEI ensures the effective suppression of dendrites.

Figure 7:
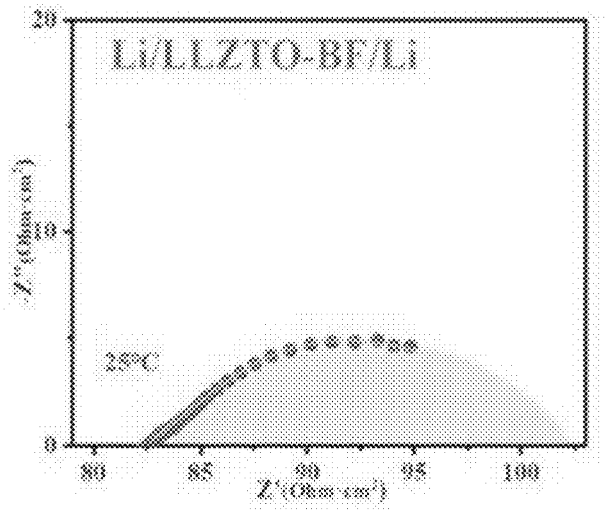
FIG. 7 illustrates an electrochemical impedance spectroscopy (EIS) profile of symmetric Li cells with LLZTO-BF in Sample 1, according to some embodiments.

FIG. 7 illustrates an electrochemical impedance spectroscopy (EIS) profile of symmetric Li cells with LLZTO-BF in Sample 1 showing a greatly reduced ASR of ~9 $\Omega cm^2$ at room temperature (e.g., ~25° C.), corresponding to an improved Li/LLZTO interface (for example, the Comparative Sample has a much larger ASR of about 450 $\Omega cm^2$ at ~25° C.).

Figure 8A:
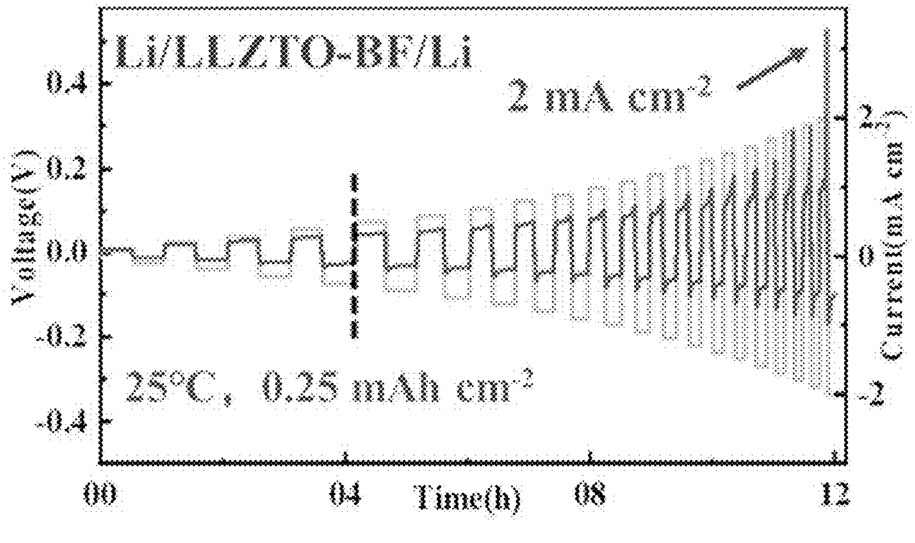
FIGS. 8A and 8B illustrate voltage-time profiles of Li/LLZTO-BF/Li cells on galvanostatic cycling with stepped current density and constant capacity at 25° C. in Sample 1 (FIG. 8A) and prolonged galvanostatic cycling of symmetric Li cells with bare LLZTO and LLZTO-BF at 25° C.
Figure 8B:
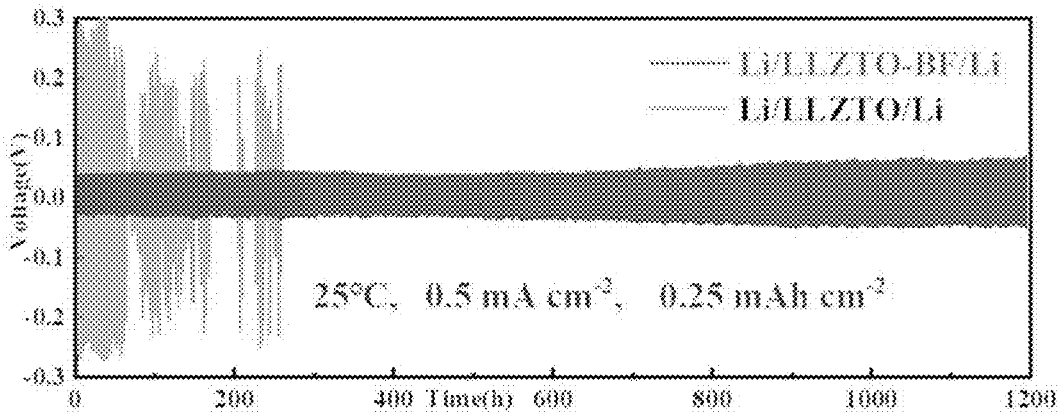
Figure 9A:
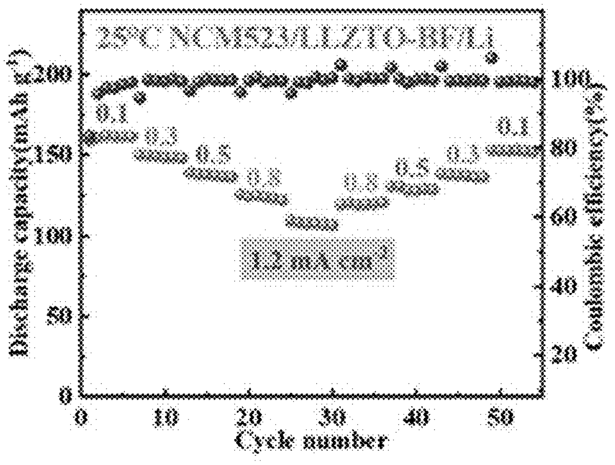
FIGS. 9A-9F illustrate cycling performance (FIGS. 9A, 9C) and voltage-capacity profiles (FIG. 9B) of quasi-solid-state batteries with NCM523 at 25° C. in Sample 5; and cycling performance (FIGS. 9D, 9F) and voltage-capacity profiles (FIG. 9E) of quasi-solid-state batteries with LFP at 60° C. in Sample 6, according to some embodiments.
Figure 9B:
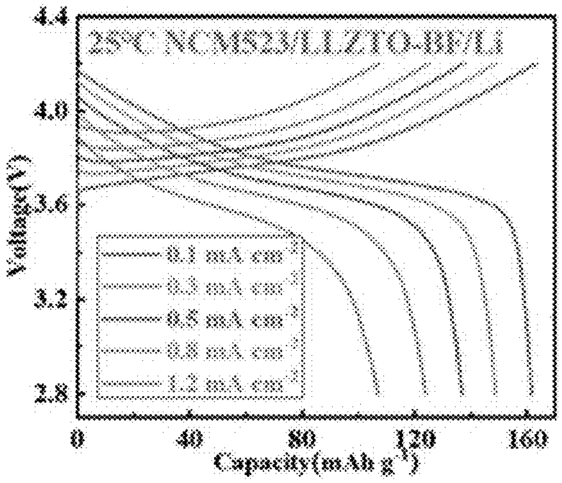
Figure 9C:
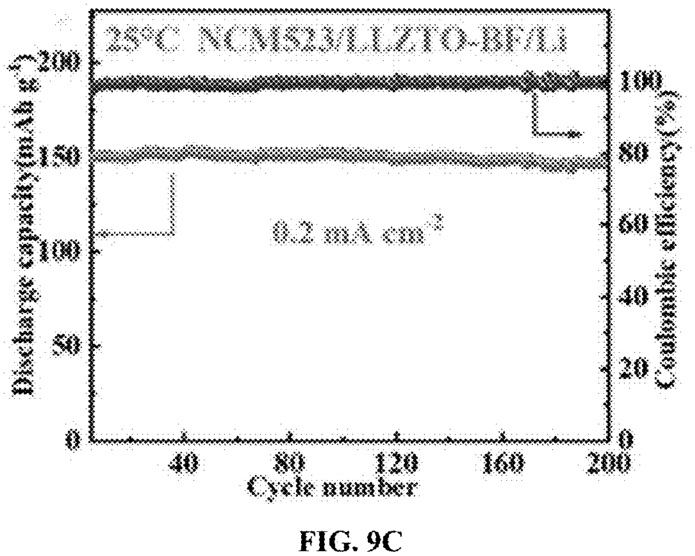
Figure 9D:
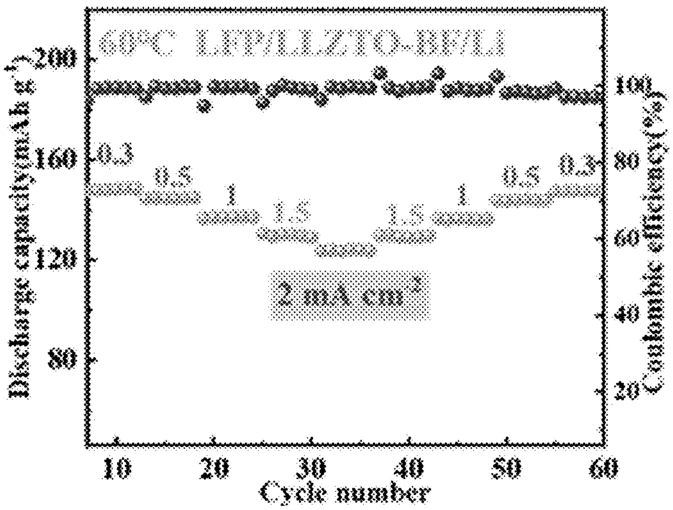
Figure 9E:
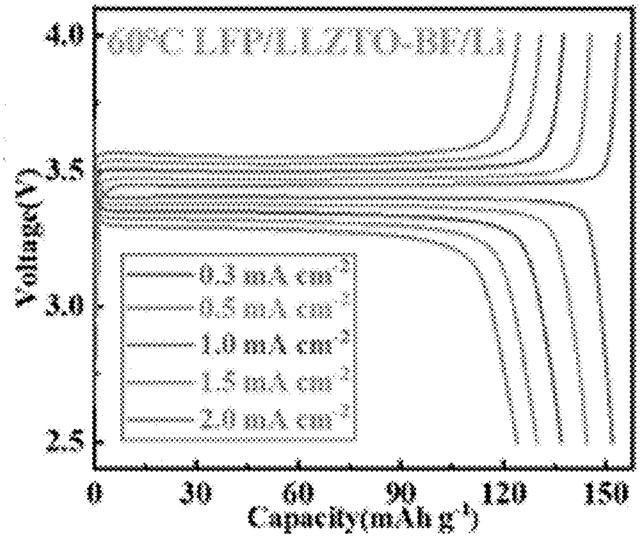
Figure 9F:
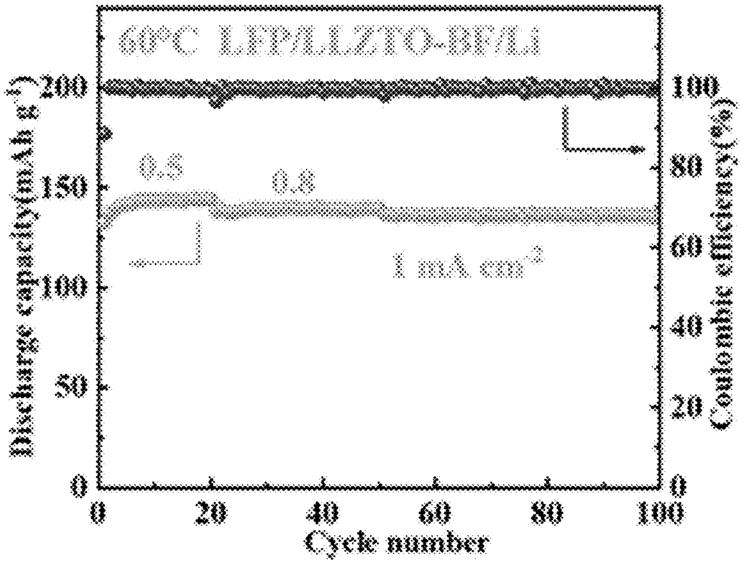

FIGS. 8A and 8B illustrate voltage-time profiles of Li/LLZTO-BF/Li cells on galvanostatic cycling with stepped current density and constant capacity at 25° C. in Sample 1 (FIG. 8A) and prolonged galvanostatic cycling of symmetric Li cells with bare LLZTO (Comparative Sample) and LLZTO-BF (Sample 1) at 25° C. (FIG. 8B). FIG. 8A shows an improved CCD of 2 mA $cm^{-2}$ (0.25 mAh $cm^{-2}$) without short circuit. According to FIG. 8B, the Li/LLZTO/Li battery (Comparative Sample) shows a large voltage polarization and short circuits within a limited time (under 300 hrs), indicating a poor interface with slow and uneven Li ion transport. The Li/LLZTO-BF/Li battery (Sample 1) shows excellent cycling stability at 0.5 mA $cm^{-2}$ (0.25 mAh $cm^{-2}$) for 1200 hrs at room temperature, indicating that the functional SEI at the Li/SSE interface can inhibit lithium dendrites and prolong battery lifespan.

FIGS. 9A-9F illustrate cycling performance (FIGS. 9A, 9C) and voltage-capacity profiles (FIG. 9B) of quasi-solid-state batteries with NCM523 cathodes at 25° C. in Sample 5; and cycling performance (FIGS. 9D, 9F) and voltage-capacity profiles (FIG. 9E) of quasi-solid-state batteries with LFP cathodes at 60° C. in Sample 6. From FIGS. 9A-9C, NCM523/LLZTO-BF/Li batteries discharge over 160 mAh $g^{-1}$ capacity at 0.1 mA $cm^{-2}$ and operate normally at a high current density of 1.2 mA $cm^{-2}$ at 25° C. without short circuit. The batteries can stably cycle at 0.2 mA $cm^{-2}$ for over 200 times. From FIGS. 9D-9F, LFP/LLZTO-BF/Li batteries show good rate capability and exhibit a low overpotential even at 2 mA $cm^{-2}$, with the cells show good cycling stability at 1 mA $cm^{-2}$ at 60° C.

Figure 10:
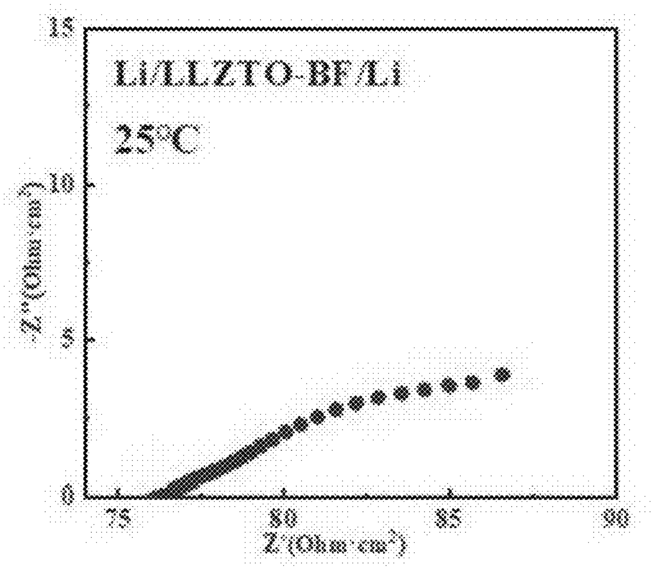
FIG. 10 illustrates an EIS profile of symmetric Li cells with LLZTO-BF in Sample 2, according to some embodiments.
Figure 11:
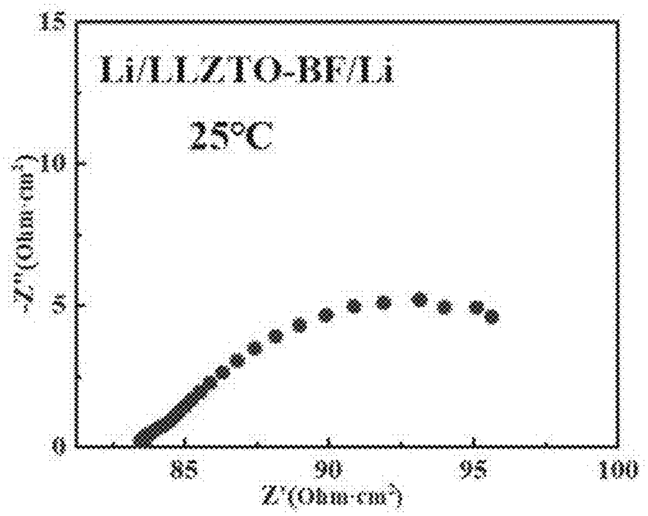
FIG. 11 illustrates an EIS profile of symmetric Li cells with LLZTO-BF in Sample 3, according to some embodiments.
Figure 12:
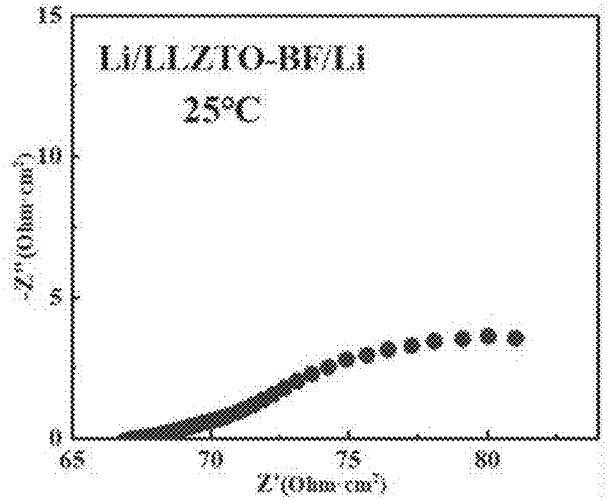
FIG. 12 illustrates an EIS profile of symmetric Li cells with LLZTO-BF in Sample 4, according to some embodiments.

FIGS. 10-12 illustrate EIS profiles of symmetric Li cells with LLZTO-BF in Samples 2-4, respectively. In each instance, Samples 2-4 demonstrate an improved Li/LLZTO interface with a greatly reduced ASR (e.g., improved Li ion transport) of between about 10-11 $\Omega cm^2$ at 25° C. (for example, the Comparative Sample has a much larger ASR of about 450 $\Omega cm^2$ at ~25° C.).

Figure 13:
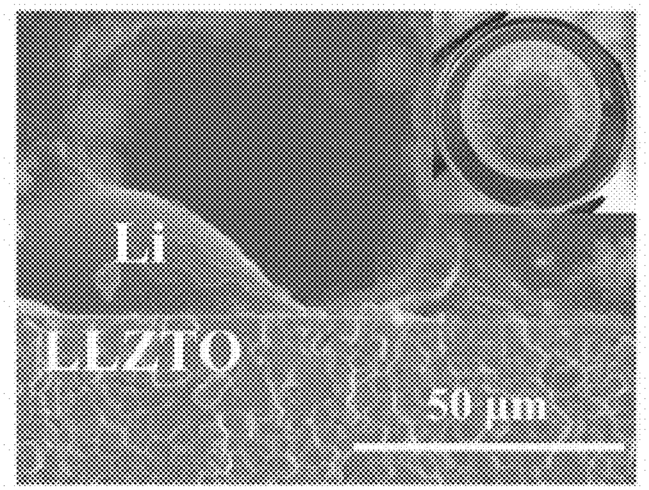
FIG. 13 illustrates a cross-sectional view SEM image of bare LLZTO/Li, inset is the corresponding digital image in Comparative Sample, according to some embodiments.
Figure 14:
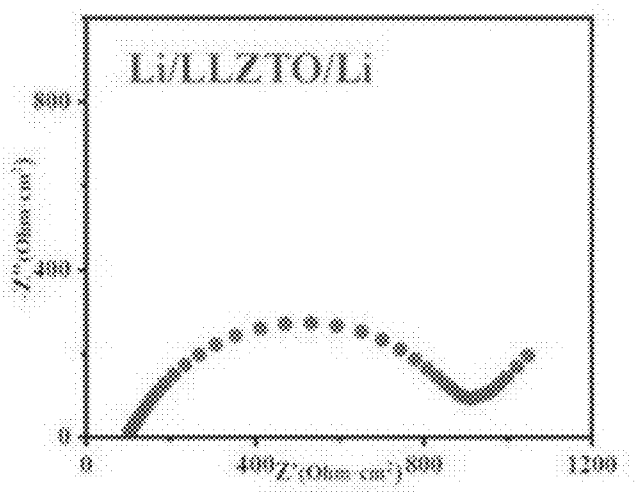
FIG. 14 illustrates an EIS profile of symmetric Li cells with bare LLZTO in Comparative Sample, according to some embodiments.

In comparison, FIG. 13 illustrates a cross-sectional view SEM image of bare LLZTO/Li (i.e., no modification layer), with the inset corresponding to a digital image of the Comparative Sample. The Li foil is shown to wrinkle and shrink on the bare LLZTO surface, with holes observed at the interface indicating a poor interfacial contact. This is confirmed by FIG. 14, which illustrates an EIS profile of symmetric Li cells with bare LLZTO in Comparative Sample. Whereas the ASR was between 9-11 $\Omega cm^2$ at 25° C. for Samples 1-4 (FIGS. 7 and 10-12, respectively), a much larger ASR is seen for the Comparative Sample at about 450 $\Omega cm^2$ at 25° C., which corresponds to a poor Li/LLZTO interface. In some embodiments the ASR for the examples disclosed herein may be less than 50 $\Omega cm^2$, or less than 25 $\Omega cm^2$, or less than 15 $\Omega cm^2$, or less than 10 $\Omega cm^2$.

Thus, as presented herein, this disclosure relates to a solid electrolyte with lithium salt modification layer used in solid-state Li batteries. The modification layer comprises inorganic lithium salt, such as at least one of the $LiBF_4$, $LiPF_6$, $LiPF_2O_2$, $Li_2SiF_6$, $LiAlF_4$, $Li_3AlF_6$, $LiAsF_6$, $LiSbF_6$, their corresponding aquo-compounds, and combinations thereof.

The modification layer was in situ introduced onto the SSE surface via the following process. The SSE surface was first treated by at least one of the aqueous $H_3BO_3$, $H_3PO_4$, $H_3PO_3$, $H_3PO_2$, $H_4SiO_4$, $H_2SiO_3$, H2SiO$_5$, $H_3AlO_3$, $H_3AsO_4$, $H_3AsO_3$, and $H_3SbO_3$ solutions, or combinations thereof. A solvent was used to dissolve the above acids, for example, deionized water or an aqueous solution mixture comprising deionized water and other organic solvents, such as at least one of methyl alcohol, ethyl alcohol, isopropyl alcohol, ethyl acetate, acetone, acetonitrile, N,N-dimethylformamide, N-methylpyrrolidone, N-methylacetamide, and combinations thereof. Then, HF vapor or HF solution may be used to modify the SSE surface to form the final modification layer. The modification layer exhibits superior lithiophilicity, which can react with metal anode to form functional interphase, thus greatly enhancing the affinity between the SSE and anode to reduce the interfacial resistance.

The formed functional interphase with high surface energy can guide the horizontal deposition of lithium, so as to inhibit dendrite formation and growth. Based on the SSE with modification layer, the symmetric batteries can achieve greatly reduced ASR of ~9 $\Omega cm^2$ and an improved critical current density (CCD) of ~2 mA $cm^{-2}$ at room temperature (RT). And the solid-state batteries with $LiFePO_4$ (LFP) or $LiNi_{0.5}Co_{0.2}Mn_{0.3}O_2$(NCM523) cathode display excellent long-term cycling performance and can work normally at high current density.

Advantages include: (1) an in situ modification layer introduced via aqueous acid strategy; (2) the modification is made with a facile, efficient, easy-to-control, and self-terminated method; (3) the modification layer with superior lithiophilicity greatly enhanced the affinity between SSE and Li; (4) functional interphase formed by the reaction between modification layer and Li effectively suppressed dendrites; (5) a greatly reduced Li/SSE interfacial resistance (~9 $\Omega cm^2$) and improved CCD (~2 mA $cm^{-2}$) at room temperature; and (6) an improved cycling performance of solid state batteries.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

As utilized herein, "optional," "optionally," or the like are intended to mean that the subsequently described event or circumstance can or cannot occur, and that the description includes instances where the event or circumstance occurs and instances where it does not occur. The indefinite article "a" or "an" and its corresponding definite article "the" as used herein means at least one, or one or more, unless specified otherwise.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed:

1. A method of forming a lithium-metal battery, comprising:

treating a garnet solid-state electrolyte with an acid solution; and exposing the acid-treated garnet solid-state electrolyte to hydrogen fluoride to form a modification layer on the garnet solid-state electrolyte, wherein the modification layer comprises at least one of $LiBF_4$, $LiPF_6$, $LiPF_2O_2$, $Li_2SiF_6$, $LiAsF_6$, $LiSbF_6$, corresponding aquo-compounds thereof, or combinations thereof.

2. The method of claim 1, wherein the acid solution comprises $H_3BO_3$, $H_3PO_4$, $H_3PO_3$, $H_3PO_2$, $H_4SiO_4$, $H_2SiO_3$, $H_2SiO_5$, $H_3AsO_4$, $H_3AsO_3$, $H_3SbO_3$, or combinations thereof.

3. The method of claim 1, wherein the hydrogen fluoride is a hydrogen fluoride vapor.

4. The method of claim 1, wherein the hydrogen fluoride is a hydrogen fluoride solution.

5. The method of claim 1, wherein the modification layer comprises at least one of $LiBF_4$, or corresponding aquo-compounds thereof.

6. The method of claim 1, wherein a thickness of the modification layer ranges from 20 nm to 1000 nm.

7. The method of claim 1, wherein the modification layer comprises nanopores having a diameter ranging from 1 nm to 100 nm.

8. The method of claim 1, further comprising:

disposing the garnet solid-state electrolyte on a cathode; and disposing a lithium anode on the garnet solid-state electrolyte, wherein the modification layer is disposed at an interface between the lithium anode and the garnet solid-state electrolyte.

9. The method of claim 8, wherein an interfacial area specific resistance at the interface is less than 15 $\Omega$~$cm^2$.

10. The method of claim 8, wherein the lithium-metal battery has a critical current density (CCD) of 2 mA $cm^{-2}$ at room temperature (25° C.).

11. The method of claim 8, wherein the lithium anode is in continuous contact with the garnet solid-state electrolyte through the modification layer such that no gaps are observed at the interface.

12. The method of claim 2, wherein the acid solution comprises $H_3BO_3$.

* * * * *